US007685692B2

(12) United States Patent
Rankin, Jr. et al.

(10) Patent No.: US 7,685,692 B2
(45) **Date of Patent: *Mar. 30, 2010**

(54) PROCESS FOR REMOVING MATERIAL FROM A SUBSTRATE

(75) Inventors: Charles M. Rankin, Jr., Penfield, NY (US); Theodore K. Ricks, Rochester, NY (US); Megan L. Weiner, Rochester, NY (US); John P. Macauley, Henrietta, NY (US); Rusty J. Coleman, Hilton, NY (US)

(73) Assignee: Industrial Technology Research Institute, Hsinchu (TW)

( * ) Notice: Subject to any disclaimer, the term of this patent is extended or adjusted under 35 U.S.C. 154(b) by 1658 days.

This patent is subject to a terminal disclaimer.

(21) Appl. No.: 10/851,913

(22) Filed: May 21, 2004

(65) Prior Publication Data

US 2006/0000338 A1 Jan. 5, 2006

(51) Int. Cl.
*B23P 19/02* (2006.01)
*G03G 15/14* (2006.01)

(52) U.S. Cl. ..................................... 29/426.4; 399/398

(58) Field of Classification Search .................. 29/557, 29/DIG. 96, 426.4; 349/187; 399/323, 398, 399/399, 322
See application file for complete search history.

(56) References Cited

U.S. PATENT DOCUMENTS 1,940,106 A 12/1933 Snyder
3,559,285 A * 2/1971 Kauffman .................... 29/827
4,420,152 A 12/1983 Miyashita
4,863,610 A 9/1989 Campbell
5,140,936 A 8/1992 Strong et al.
5,399,390 A 3/1995 Akins
5,506,668 A 4/1996 Guth
5,532,810 A 7/1996 Cahill
5,589,925 A 12/1996 Cahill
5,659,865 A 8/1997 Zarbo
5,670,202 A 9/1997 Guzowski et al.
5,893,012 A 4/1999 Schubert et al.
5,905,932 A 5/1999 Morse et al.
6,029,039 A 2/2000 Aslam et al.
6,104,000 A 8/2000 Aslam et al.
6,136,141 A 10/2000 Glatfelter et al.
6,208,827 B1 3/2001 Aslam et al.
6,394,870 B1 5/2002 Petruchik et al.
6,469,757 B1 10/2002 Petruchik
6,470,782 B1 10/2002 Shimotoyodome et al.
6,524,681 B1 2/2003 Seitz et al.
6,564,030 B2 5/2003 Baughman et al.
D478,383 S 8/2003 Timm et al.
6,678,496 B1 1/2004 Aslam et al.
6,813,464 B2 11/2004 Amita et al.

(Continued)

FOREIGN PATENT DOCUMENTS

DE 54793 4/1890

(Continued)

*Primary Examiner*—David P Bryant
*Assistant Examiner*—Sarang Afzali
(74) *Attorney, Agent, or Firm*—Alston & Bird LLP

(57) ABSTRACT

A process for skiving a substrate is described, wherein the substrate is skived with a roller or a device or apparatus including the roller. The roller provides a cleaner skive than previously known methods without damage to underlying materials.

45 Claims, 6 Drawing Sheets

U.S. PATENT DOCUMENTS

| | | | | |
|---|---|---|---|---|
| 7,024,153 | B2 * | 4/2006 | Weiner et al. | 399/398 |
| 7,245,346 | B2 * | 7/2007 | Weiner et al. | 349/187 |
| 7,485,191 | B2 | 2/2009 | Axtell et al. | |
| 2003/0168319 | A1 | 9/2003 | Hart et al. | |
| 2005/0056127 | A1 | 3/2005 | Yamabuchi et al. | |
| 2005/0257811 | A1 | 11/2005 | Axtell et al. | |

FOREIGN PATENT DOCUMENTS

| | | |
|---|---|---|
| DE | 82085 | 9/1894 |
| DE | 175103 | 12/1904 |
| DE | 43 41 627 | 6/1995 |
| EP | 1 321 251 | 1/2006 |
| JP | 2004-117540 | 4/2004 |
| WO | WO 03/040049 | 5/2003 |

* cited by examiner

PROCESS FOR REMOVING MATERIAL FROM A SUBSTRATE

CROSS REFERENCE TO RELATED APPLICATIONS

Cross-reference is made to related, co-filed U.S. patent application Ser. No. 10/851,560 to Axtell et al., filed May 21, 2004, entitled "Nozzle Tip and Methods of Use," issued on Feb. 3, 2009 as U.S. Pat. No. 7,485,191, U.S. patent application Ser. No. 10/851,451 to Axtell et al., filed May 21, 2004, entitled "Method of Making an Electronic Display," now abandoned, co-filed U.S. patent application Ser. No. 10/851,492 to Weiner et al., filed May 21, 2004, entitled "Skiving Device And Methods Of Use", issued on Apr. 4, 2006 as U.S. Pat. No. 7,024,153, U.S. patent application Ser. No. 10/851,590 to Weiner et al., filed May 21, 2004, entitled "METHOD OF MAKING AN ELECTRONIC DISPLAY", issued on Jul. 17, 2007 as U.S. Pat. No. 7,245,346, and co-filed U.S. patent application Ser. No. 10/851,439 to Rankin et al., filed May 21, 2004, entitled "Method of Making an Electronic Display", now abandoned.

FIELD OF THE INVENTION

A roller and methods for selectively removing material using the roller are presented.

BACKGROUND OF THE INVENTION

Often in manufacturing processes, a material, or a portion of a material, needs to be removed before further processing steps can occur. Such material removal can be referred to as "skiving." Various methods of skiving or material removal are known in manufacturing processes.

U.S. Pat. No. 6,678,496 discloses a mechanism for skiving fuser rollers using skive assemblies including elongated, thin, flexible members that scrape material from the fuser apparatus roller. An air plenum with a nozzle arrangement provides positive airflow to ensure that the fuser apparatus roller is fully stripped. The skiving assembly as described in this patent scrapes the material away, and any remaining material is removed by airflow from the nozzle.

It has been shown in U.S. Pat. Nos. 5,532,810; 5,589,925; and 6,029,039 that elongated skive fingers of limited flexibility mounted in particularly configured support bodies substantially prevent damaging flex of the skive fingers. In these skive mechanisms, the support bodies support a major portion of the skive fingers and pivot into engagement with the fuser roller to limit skive finger flexing when engaged by a material to be skived, typically from a roller. The skive fingers can be retractable to prevent damage by jammed materials.

U.S. Pat. No. 5,670,202 discloses a technique for selectively applying materials in a pattern by spraying and then collecting the excess materials using adjustable skive manifolds on each side of the spray pattern, which function to vacuum off the edges of the airless spray pattern. The system utilizes a robot manipulator, a masking tool assembly, and other hardware, to recover material sprayed and skived by the masking tool assembly.

U.S. Pat. No. 6,564,030 discloses a fuser station with a vented skive assembly for an image-forming machine. The image-forming machine has a photoconductor, a primary charger, an exposure machine, a toning station, a transfer charger, and a vented fuser station. The fuser station may include a pressure roller, a fuser roller, and a skive assembly. The skive assembly has rib sections forming one or more slots, which are configured to provide an airflow pattern to reduce condensation.

U.S. Pat. No. 6,136,141 discloses fabrication of lightweight semiconductor devices including removal of a substrate from a support member utilizing a beam of radiant energy. The substrate is skived from the support member without damage to the semiconductor device. This method can be implemented on a continuous, roll-to-roll basis wherein the substrate and support member each comprise an elongated web, and wherein the webs are continuously advanced through a plurality of deposition chambers and the skiving area.

U.S. Published Application No. 2003/0049059 discloses a method and structure for cleaning a roller in an imaging apparatus, including use of a cleaner assembly having a skive blade in contact with the roller. The skive blade can be selectively mounted on and removed from the cleaner assembly.

U.S. Pat. No. 6,469,757 discloses a technique for selectively removing a liquid crystalline material layer from a multi-layered substrate. The liquid crystalline material was coated and dried on the substrate, then a nozzle tip was used to remove the liquid crystalline material from the substrate, as it was moved on a rotating drum past the nozzle in a batch process. To remove all the desired material using this nozzle, multiple nozzle passes may be needed, prohibiting roll-to-roll processing. It has been found that harder materials, for example, cross-linked materials, cannot be skived with this process.

It would be advantageous to have a means of removing any amount of material, from a portion of a layer to more than one layer of material, in a batch or a roll-to-roll (continuous) manufacturing process. Further, a method and apparatus capable of removing materials of varying hardness, for example, solvents (including water), metal, gelatin, liquid crystal, polymers, ceramics and pulp, is desirable.

SUMMARY

A process for skiving a substrate is described, wherein the substrate comprises a support and a layer, comprising providing the substrate to a skiving assembly comprising at least one roller having a surface; contacting the surface of at least one roller with the layer; and moving the skiving assembly in relation to the substrate to remove at least a portion of the layer and expose at least a portion of the support, wherein the exposed portion of the support is undamaged.

ADVANTAGES

The process of skiving using the roller as described herein is suitable for skiving materials of all types, from soft coatings to hard materials such as metal, cross-linked polymers, or dried materials. The roller is capable of removing from a portion of a layer to more than one layer of material in a single pass. Skiving using the roller, or a device or apparatus including at least one roller, can be done in a batch or a roll-to-roll process. Single- or multiple-pass skiving can be done.

BRIEF DESCRIPTION OF THE DRAWINGS

The invention can be understood with reference to the detailed description below and the accompanying figures, as follows.

DETAILED DESCRIPTION OF THE INVENTION

The present invention provides methods and apparatuses useful for removing, displacing, or patterning materials in a layer by the use of a roller during a manufacturing process. The method and apparatus can be useful in manufacturing of various materials, including, for example, graphic arts, metal working, paper molding, food process, imaging and display materials, display devices, electronic devices, and other coated materials.

"Skiving" is the controlled removal of at least a portion of one or more layers. As used herein, skiving is done by a roller, alone or in combination with other material removal methods. The removal or patterning of the material can be by cutting or displacement.

"Substrate" as used herein is one or more layers, which can be the same or different composition. The substrate can be skived to remove material therefrom.

"Material" as used herein refers to the portion of the substrate that is removed, or intended to be removed, by skiving.

A roller can have two sides and a face. The roller can be made of a machinable material, a moldable material, or a combination thereof. For example, the roller can be metal, such as stainless steel; ceramic; glass; or a polymer. The roller can be acetal polyoxymethylene, polyethylene, or polypropylene. The roller, or a portion thereof, can be a combination of two or more materials. For example, the roller can be manufactured of one material, and a second material can be applied to the first material to form all or a portion of the roller face.

At least a portion of the roller face can be coated with a material suitable for increasing durabilty, reducing friction, preventing wear, or providing other desirable mechanical properties to the roller during use, wherein the roller interacts with a substrate to remove material from the substrate. For example, to increase wear and reduce friction of the roller face, fluoropolymers such as Teflon®, or acetal resins such as Delrin®, both from E. I. Dupont de Nemours and Company, Delaware, can be used.

Figure 1A:
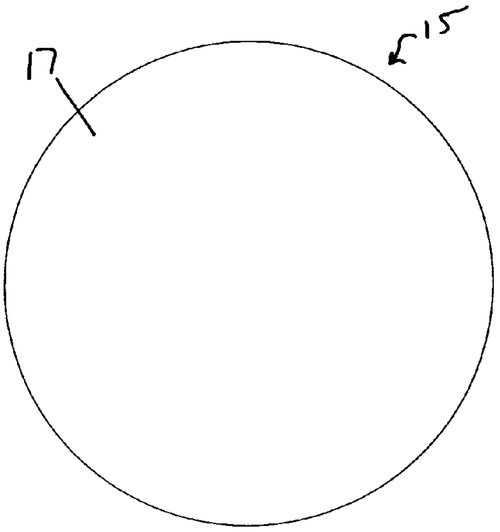
FIGS. 1A-1H illustrate various roller profiles.

As shown in FIG. 1A, the shape of the roller 15 refers to the shape of a side 17. The roller shape can be round, ovoid, elliptical, or any other suitable shape. The roller shape can be symmetrical. Polygonal shapes can be used, for example, a triangle, hexagon, octagon, dodecagon, and the like. Irregular but rotable shapes can be used for the roller. The roller can be rotable around an axis. The shape of the roller can effect the resulting skive depth and regularity of the skive.

As shown in FIGS. 1B-1H, the roller face 18 can have various configurations. For example, the roller face 18 can be squared, radiused, chamfered, beveled, convex, concave, parabolic, a chevron, or patterned. The face can have a surface including a central portion and two side portions. According to certain embodiments, at least one of the side portions can be longer than the central portion. At least one of the side portions can be shorter than the central portion. Each of the side portions and the central portion can be the same or different lengths. Each side portion independently can be squared, chamfered, radiused, beveled, concave, convex, parabolic, or patterned. The side portions can be identical. The side portions can be mirror images of each other. The roller face can include one or more channel separating the face into two or more sections.

Figure 1B:
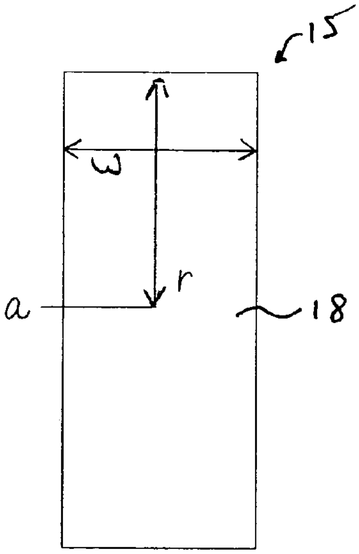

As shown in FIG. 1B, the roller face 18 can be squared, wherein the surface of the face 18 intersects the side 17 at an angle of about 90 degrees.

Figure 1C:
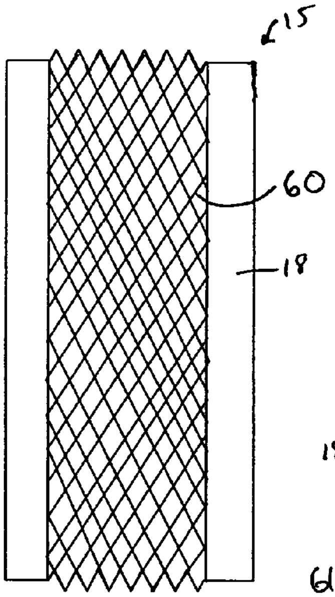

As shown in FIG. 1C, the face 18 can be patterned. The patterning 60 can extend across all or only a portion of the face 18. More than one pattern 60 can be present on the face 18. A patterned face 18 can be combined with any other configuration. At least a portion of the pattern of the face 18 can be transferred to the substrate during skiving.

Figure 1D:
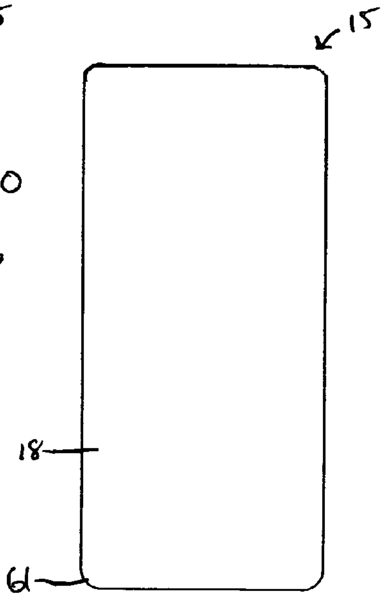

As shown in FIG. 1D, the roller face can be radiused, such that the roller face 18 is curved at least at a portion of the roller face 61 intersecting the roller side 17. All or a portion of the roller face can be curved.

Figure 1E:
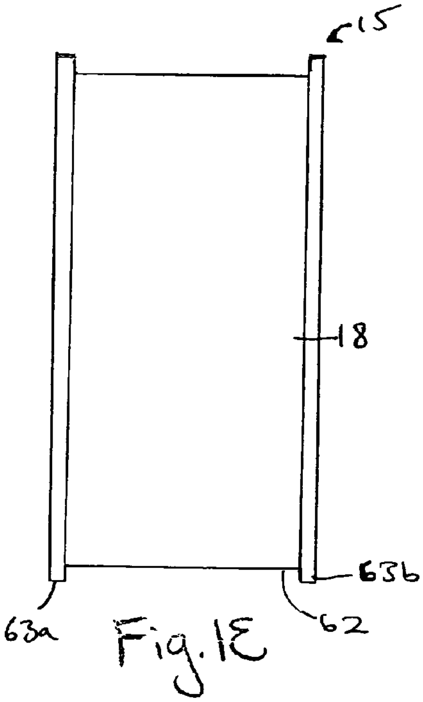

As shown in FIG. 1E, the roller face 18 can be undercut, wherein the roller face 18 has a central portion 62 and two side portions 63*a* and 63*b*, and the side portions 63*a* and 63*b* are longer than the central portion 62. A roller face 18 can also have a central portion longer 62 than the side portions 63*a* and 63*b*. The side portions 63*a* and 63*b* can be the same or different lengths.

Figure 1F:
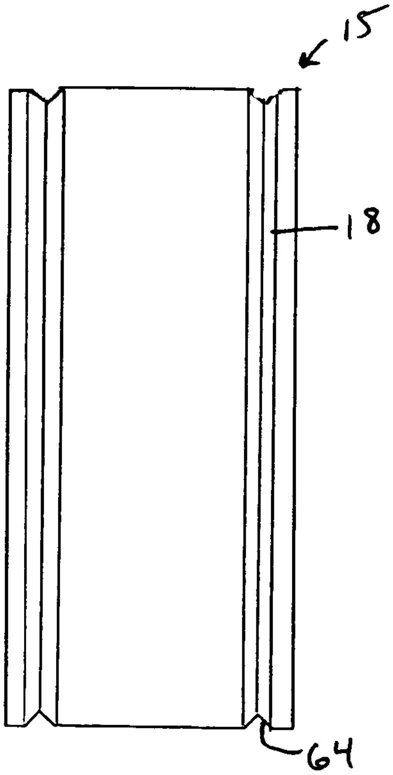

As shown in FIG. 1F, the roller face 18 can have at least one channel 64 separating the roller face 18 into two or more sections. The channel 64 can be concave, angled, a chevron, curved, or parabolic. The channel 64 can be symmetrical or asymmetrical. The depth of the channel 64 can be determined based upon the desired effect. The channel 64 can be sufficiently deep to aid in removal of skived material. The channel 64 can be shallow enough to skive or pattern the substrate with which the roller 15 is in contact.

Figure 1G:
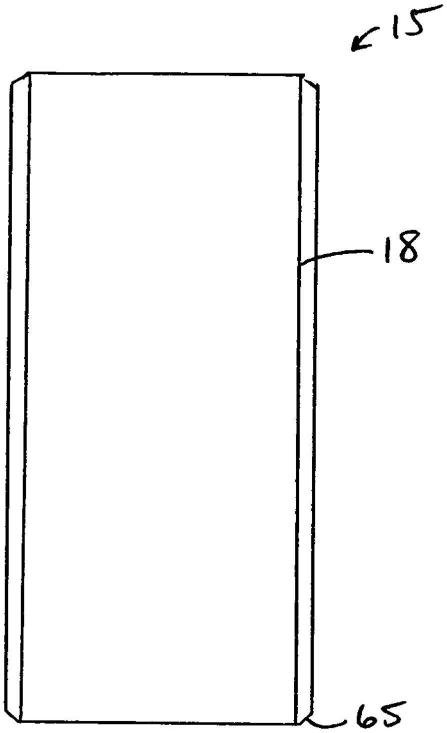

As shown in FIG. 1G, one or more edge 65 of the roller face 18 can be chamfered. The angle of the chamfer can be between 0 and 90 degrees.

Figure 1H:
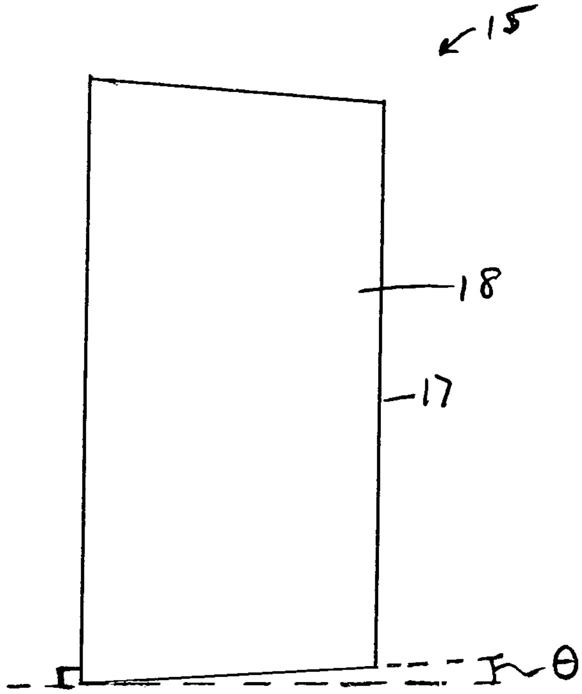

As shown in FIG. 1H, the surface of the roller face 18 can be beveled. All or a portion of the roller face 18 can be beveled. According to certain embodiments, the roller face 18 can have one or more beveled areas, forming a chevron, a point, a stepped surface, or other angled surface. The angle θ of the bevel can be from 0 to 90 degrees, for example, from 0 to 60 degrees, from 0 to 45 degrees, less than 30 degrees, less than 20 degrees, less than five degrees, or less than one degree, wherein the angle is measured from a line perpendicular to the roller side 17, as shown in FIG. 1H.

The roller can be configured so that the roller shape and configuration of the roller face minimizes contact area with the substrate. Reducing the contact surface area can reduce friction between the roller face and the substrate. The contact surface area between the roller face and the substrate can be large enough to create friction sufficient to rotate the roller about an axis during skiving. The roller can be configured to increase the cutting efficiency of the roller face. The roller can be configured to reduce or prevent material retention by the roller. The roller can be configured to provide minimal or no damage to the structure of the unskived portion of the substrate.

The width and diameter of the roller can vary depending on the application. The width "w" of the roller is a measurement of the roller from side to side across the widest portion of the roller face, as shown in FIG. 1B. The radius "r" of the roller is the longest measurement from the axis of rotation "a" to the face, as shown in FIG. 1B. The width of the roller determines the width of the skive area. According to certain embodiments, the roller can have a width of 0.1 millimeters to 2 meters, for example, from 0.5 meter to 1 meter, less than 0.5 meter, or from 2 to 8 millimeters. Smaller or larger widths can be used depending on the application. The width can be smaller, larger, or the same as the radius of the roller.

Figure 2:
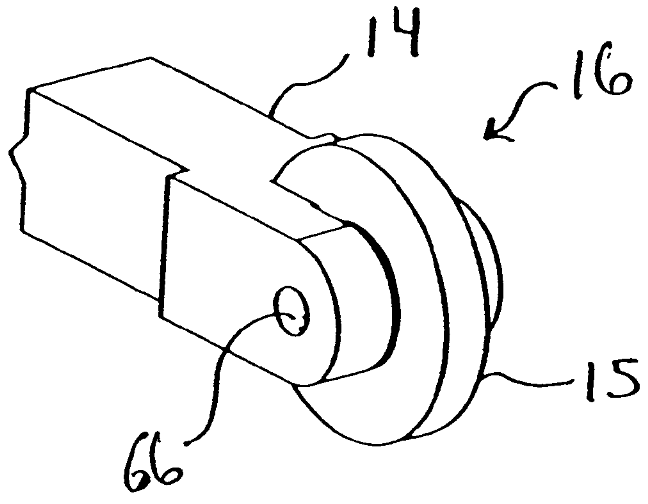
FIG. 2 is a device including a roller.

The roller can be part of a device 16, such as a skiving device, as shown in FIG. 2. The device 16 can include roller 15 mounted on axis 66 in housing 14. The housing can be any material, for example, metal, wood, ceramic, or a polymer, such as a hard plastic. As shown in FIG. 2, the housing 14 can extend along either side of roller 15 to the location of the axis 66. The housing 14 can cover all but some portion of the face of roller 15. The exposed portion of roller face can be at least as large as the desired contact area between the roller face and the substrate. The housing should not extend so far as to interfere with relative movement of the roller and substrate.

Figure 3:
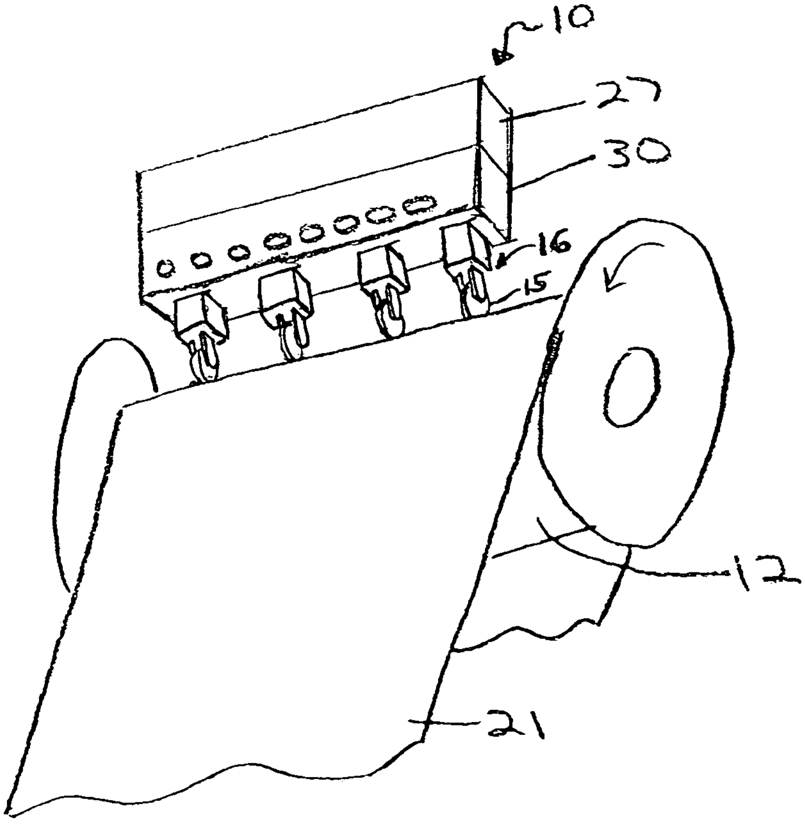
FIG. 3 is an illustration of a skiving apparatus.

The device 16 can be part of a skiving assembly 10 as shown in FIG. 3. The skiving assembly 10 can include one or more device 16. The rollers 15 in an assembly 10 can be the same or different. The assembly 10 can have the rollers arranged linearly, staggered, or in any desirable pattern. The rollers 15 can be positioned to skive in the direction of movement of the substrate, called the web direction, or in the cross-web direction, wherein the cross-web direction is any direction not parallel the web direction.

The roller, housing, apparatus, or a combination thereof can include an indicia. The indicia can indicate, for example, the type of roller, or the location of the roller in an apparatus. The indicia can be in any form, for example, a line, color, dot, pictogram, lettering, numbers, or a combination thereof. The indicia can be an alignment means, such as a tab/slot interaction, groove, keyway, or other three-dimensional alignment feature.

As shown in FIG. 3, devices 16 including rollers 15 can be positioned in or attached to an alignment block 30. The alignment block can maintain alignment of one or more rollers with respect to the substrate, other rollers, the distance of each roller from a support, or a combination thereof. Use of an alignment block can result in repeatable and precise placement of one or more roller with respect to the substrate and support. The alignment block can be used with a single device, or can bridge more than one device, such as in a skiving assembly.

As shown in FIG. 3, assembly 10 can optionally include a manifold 27. The manifold 27 can be attached to alignment spacing block 30 to supply a vacuum source for removing material skived from substrate 21 from the face of rollers 15. The manifold 27 or alignment block 30 can provide other roller face cleaning apparatuses besides a vacuum, for example, a suction nozzle, a skive finger, a doctor blade, a brush, or a combination thereof. The manifold 27 or the alignment block 30 can provide one or more solvent to clean the roller face. The solvent can be capable of softening or removing the material from the roller face. Suitable solvents can include, for example, alcohol, acid, base, ammonia-based solvent, bleach-based solvent, water, distilled water, organic solvent, inorganic solvent, air, and surfactant. Each roller can be used in conjunction with one or more different solvent, wherein the solvent can be optimized for the material being removed by that roller.

If a vacuum source, such as manifold 27, is used in assembly 10, the vacuum source and applied pressure can be common to all rollers. Separate vacuum sources can be used where one or more roller require a different level of vacuum for material removal. Different vacuum forces on at least two rollers can be achieved by various means, including, for example, use of separate vacuum sources, a metered manifold, or adjustments to the roller/vacuum configuration. Each roller can have a different vacuum force applied from at least one other roller.

Vacuum can be formed by any known means. For example, the vacuum can be generated by an air drawn suction system, for example, a turbine. The vacuum pressure can be controlled manually or automated. The vacuum pressure can range from 0 to 760 mm Hg. The force exerted by the vacuum on a roller face can range from 0 to an absolute value of 50 $N/mm^2$. Methods of controlling vacuum pressure are known in the art, and can include use of a pressure regulator or valve. The vacuum can be connected to a reservoir for collection and disposal of material removed from the roller face. According to certain embodiments, the vacuum apparatus, reservoir, or any combination thereof, can be heated by a heating source, for example, electric heat, a water jacket, or a steam jacket, to aid in removal of material.

As shown in FIG. 3, the rollers 15 of the assembly 10 can be in contact with substrate 21 all at once, in sequence, or in any combination. The rollers 15 can all be at the same height from the support 12, or at different heights from the support 12.

The support 12 can be any material suitable for carrying the substrate 21 past the roller 15. For example, support 12 can be, but is not limited to, a web, conveyor belt, rotating table, translating table, rotating drum, or roll. The support material can be hard enough to provide support for the substrate, and provide resistance against the roller without causing damage to the substrate. The support 12 can be, for example, polymeric, metallic, ceramic, glass, fibrous, a composite material, or a combination thereof. According to various embodiments, the support 12 can be at least partially elastic, having some give under the pressure of the roller 15. For example, the support 12 can be polymeric, such as polyurethane, polyester, phenolic resin, or composite plastics.

The support can be movable relative to the assembly or device. The support and roller can be movable relative to one another. For example, the support can be moved relative to the assembly or device to compensate for side-to-side movement or slippage of the substrate. The support, device, or assembly can be translated to account for movement of the substrate. The support can be designed to minimize movement of the substrate. For example, the support can include a guide, track, groove, or other alignment mechanism to assist in keeping the substrate aligned with respect to one or more rollers. For example, the support can have a flanged edge to guide the substrate towards the assembly. According to certain embodiments, the support can be a flanged roller.

One or more roller in a device or apparatus can be positioned relative to the edge of the substrate so a material can be removed from a set location on the substrate. The roller can be positioned by attachment in the device or apparatus at a set location. For example, the roller can be attached to a manifold or alignment block at a desired distance from the edge of the substrate. The roller can be relocatably positioned in the device or apparatus, or permanently positioned. The positioning of the roller can be from a leading edge of the substrate, a side edge of the substrate, or both. The roller can be positionable within the device or apparatus, for example, by means of a linear slide actuator, spring, lever, or other adjustable mechanism. The device or apparatus can be positionable relative to the substrate to place a roller in a desired location. Any of the roller, device, or apparatus can be positioned manually, automatically, or a combination thereof. Positioning systems can include physical or optical guides to assist in locating the roller with respect to the substrate. The device or apparatus can be portable to assist in positioning.

The roller, device, assembly, or a combination thereof can be moved towards or away from the support to change the height of the roller in relation to the support. The positioning device can be a linear slide actuator, a linear motor, screw, wedge, pneumatics, hydraulics, or other mechanism capable of planar movement. The positioning device can be used to position one or more roller to maintain a uniform height with respect to the support. Each roller can have the same or a different positioning device as at least one other roller in an apparatus. The positioning device can move the roller, device, or apparatus about a pivot point, such that the movement of the roller, device, or apparatus is in an arc with respect to the substrate and support.

An application angle positioning mechanism can be used to move a device or assembly including one or more rollers around the support where the support is curved, such as a drum or roll. The position desirable for skiving can change depending upon the $T_g$ of the material being skived, the density of the material, the configuration of the roller, drying or hardening rates of the material, vacuum speed, and other factors known to those skilled in the manufacturing arts.

One or more of the above positioning systems can be combined into a single system. The system can be manually controlled, automatically controlled, or a combination thereof. Indicia as described herein can be used on one or more of the support, substrate, roller, device, or assembly to aid in positioning of the roller relative to the support and substrate.

A device or assembly including one or more rollers can include a force mechanism to hold each roller against the substrate to be skived. For example, the device or assembly can include a spring, lever, block, weight, other force exerting mechanism, or a combination thereof to position and hold the roller in relation to the support or substrate. The force mechanism can be gravity. The pressure exerted by the roller face against the substrate can be from 0 to 55 Kilopascals. The force mechanism can apply a force to the roller to maintain a uniform pressure of the roller against the substrate. If more than one roller is present, uniform pressure can be maintained at each roller, or each roller can have a different applied pressure against the substrate. Each roller can be made to skive to the same or different depth than each other roller in the apparatus. The force mechanism can compensate for variability in support thickness, substrate thickness, or a combination thereof. The force mechanism can compensate for non-uniform movement of the support, substrate, or roller. The force mechanism can compensate for roller wear during operation.

The device or assembly can include a solvent dispenser for dispensing a solvent onto the substrate. The solvent dispenser can be a nozzle, opening, slit, spray head, or other known dispensing mechanism. The dispenser can be a separate assembly, or can be located anywhere on the apparatus or device. For example, the dispenser can be part of an alignment block, positioning system, or support for the device or apparatus. The amount of solvent administered can be controlled, for example, by a metering pump, valve, or like mechanism. The mechanism can be operated manually or automated with a timer, computer, automatic controller, other control device, or a combination thereof. The solvent can be capable of softening or removing a desired material from the substrate. Suitable solvents can include, for example, alcohol, acid, base, ammonia-based solvent, bleach-based solvent, water, distilled water, organic solvent, inorganic solvent, air, and surfactant. The solvent dispenser can provide a solvent stream having the same width as the skived area. The solvent dispenser can provide a solvent stream narrower or wider than the skived area as desired. The solvent dispenser can be movable with relation to the substrate, the roller, or both. With reference to the direction of material movement, the solvent dispenser can be located prior to the roller, after the roller, or adjacent the roller. According to certain embodiments, the solvent dispenser can be located before the roller a sufficient distance such that the solvent can soften the material to be skived before it reaches the roller. The solvent can be delivered at a flow rate sufficient to wet the material without causing movement of the material. A separate solvent dispenser can be associated with one or more rollers, wherein each solvent dispenser can have a different solvent or different solvent width. The solvent temperature can be raised or lowered.

One or more additional material removal mechanisms can be used in combination with the skiving device or apparatus. For example, a vacuum tip, doctor blade, skive finger(s), or skive nozzle tip can be used with the skiving device in any configuration. The removal mechanisms can be used to remove material from the substrate, or to clean the substrate prior to or after skiving with the roller.

In use, the face of the roller contacts the material to be removed from the substrate. The material can be displaced to either side of the roller on the substrate, can adhere to the roller and be stripped from the substrate, or a combination thereof. Where the material adheres to the roller, the material can adhere loosely or strongly, and can be removed by mechanical forces, such as gravity, a vacuum, a suction nozzle, a skive finger, a doctor blade, a brush, or a combination thereof. The roller can be designed to prevent adhesion of the material, for example, by forming the roller from, or coating at least a portion of the face and/or side of the roller with, a non-stick material, such as Teflon® or Delrin®, or by coating at least a portion of the face of the roller with a surfactant, lubricant, hydrophilic coating, or hydrophobic coating. To encourage adhesion, the roller can be constructed of a tacky material, for example, a polymer, or can be coated with an adhesive. To control adhesion, the roller, substrate, or both can be heated or chilled.

Two or more rollers can be joined by a common axis for use in a device or assembly. Each roller commonly joined can have the same or different profile. The rollers can be of one material, for example, a single mold can be used to form the rollers and axis. The axis of rotation for each roller can be an axle. The axis of rotation can include ball bearings or other materials suitable for enabling rotation of the roller about the axis. The axis of rotation can be at least partially enclosed, for example, by a housing. Each roller can independently be rotable about its axis. Each roller independently can be freely rotable, turning by friction between the roller surface and the substrate. Each roller independently can be motor-driven, such that the motor controls the speed of rotation of the roller, irrespective of the movement of the substrate. The speed at which the roller rotates about the axis can be the same as the speed of the substrate movement.

Where material is removed or displaced on the substrate, a chasm is formed. The profile of the chasm created by the roller can be determined by the profile of the roller face. The depth of the chasm is dependent upon the depth to which the roller is inserted into the substrate, or the distance between the support and the roller face.

The face of the roller can be designed to clean the chasm to ensure complete material removal to a desired depth in the desired path without damage to underlying materials. The roller can remove the material in a pattern. One or more additional methods of removing material can be used in combination with the roller. For example, a vacuum tip, doctor blade, skive finger(s), solvent applicator, skive nozzle tip, or the like can be used in line with the roller, adjacent the roller, or to remove material from a different section of the substrate than the roller.

The roller, device, and assembly allow for accurate removal of a material from a predetermined location on a substrate. Use of the roller, device, or assembly for a roll-to-roll or continuous process can provide improved accuracy of skiving in the web and cross-web directions, especially as compared to prior batch processes. Use of the device or apparatus can improve the repeatability of the skiving on a substrate because the one or more roller and the substrate can be held in continuous registration. The percentage of material removed can be greatly increased over the prior art processes, for example, that described in U.S. Pat. No. 6,469,757. In U.S. Pat. No. 6,469,757, the skive tip must make 10, 20, or more sequential passes over the same location in order to clean the substrate in the desired path, removing only 2-10% of the material with each pass. The roller can remove the material in one pass. For example, the roller can remove at least 90% of the material in a single pass, for example, at least 95%, or at least 98% of the material.

The roller can remove material of various viscosities and various hardnesses. For example, materials that are cross-linked, polymerized, chill-set, or otherwise hardened, as well as low-viscosity materials, can be removed, displaced, or patterned by the roller in a batch or roll-to-roll process. Skiving methods known previously in the art are not capable of removing hardened materials in a single pass.

Substrates skived with a roller and by the methods described herein can remain undamaged such that any desirable characteristics of the exposed substrate remain unchanged. For example, the exposed substrate can have little or no disturbance of the structure and topography of the unskived portions of the substrate. For example, little or no plowing of the substrate occurs using the roller as described herein. The edges of the chasm in the substrate can be substantially smooth and free of unwanted materials, having a standard deviation of width of the chasm of less than 5%, for example, less than 2%, from the width of the roller face in contact with the substrate. The exposed substrate can maintain other desirable characteristics, including but not limited to physical properties, electrical properties, or fluidic properties. For example, the substrate can exhibit the same electrical conductivity, smoothness, roughness, appearance, or other desired property both before and after skiving with the roller.

The roller and skiving assembly or device as described herein can be used to shape substrates for various applications. Skiving can be one of many steps in substrate preparation. Skiving can be used to form intricate patterns, such as in making intricate materials, including papers, building materials, or displays, and in forming plates for lithography, intaglio, engraving, or other printing processes. Skiving can be used for making precisely controlled cuts in finished substrates, for example, in separating, forming perforations, or other cutting operations. Skiving can also be used to prepare substrates for further steps by removing unwanted material from precise locations on the substrates. For example, in manufacturing liquid crystal displays, a substrate can be formed with a support, a conductive layer such as indium tin oxide, a liquid crystal layer, and a second conductive material. The second conductive material, or the second conductive material and the liquid crystal layer, can be skived in order to expose the liquid crystal layer or the first conductive material, respectively, to allow an electrically conductive path to the first conductive material to be created. The electrically conductive path is needed to create an electrical field to change the state of the liquid crystals, enabling use as a display. The liquid crystal layer can comprise more than one layer of liquid crystals. The liquid crystal material can be nematic, smectic, ferroelectric, cholesteric, or a combination thereof. Other types of imaging elements can be made using the rollers and methods described herein, including, for example, light emitting diodes, organic light emitting diodes, electrophoretic materials, electrochromic materials, reflective print materials, and bichromal materials.

Skiving can be done in the web direction, which is the direction of movement of the substrate, or in a cross-web direction, which is any direction not parallel the direction of movement of the substrate. According to various embodiments, skiving can be done in both a web direction and a cross-web direction simultaneously. Skiving can be controlled to form any desired shape in a substrate, for example, a linear or curved shape. Skiving can be performed in one or more phases of substrate preparation, with or without intermediate steps, such as coating. Other material removal systems can be used in combination with the skiving assembly.

Figure 4:
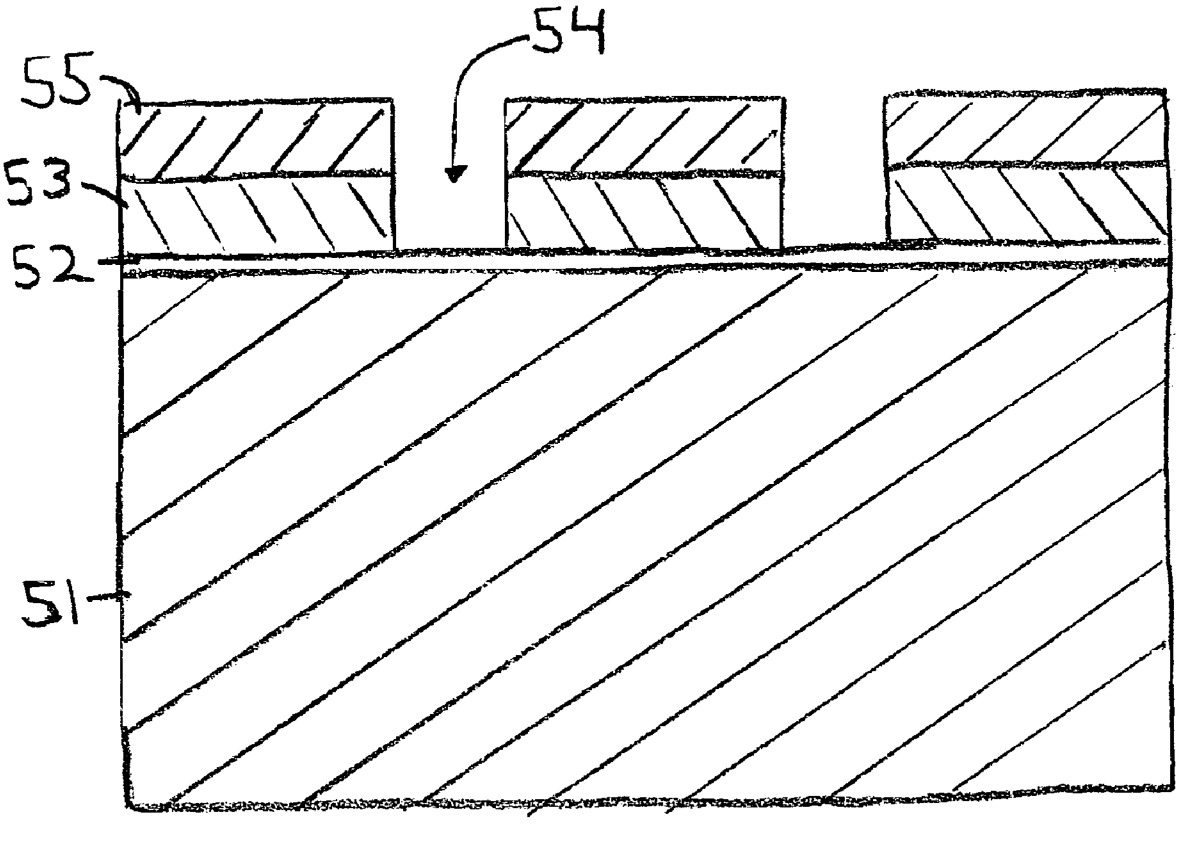
FIG. 4 depicts a substrate with one or more layers selectively removed in accordance with the present invention.

In use, the roller described herein can be used in a device or apparatus in a batch or roll-to-roll manufacturing process. For example, a liquid crystal display can be made using the roller and according to the methods described herein. As shown in FIG. 4, a support 51 can be formed of glass, or a flexible material, for example, polyethylene terephthalate. The support 51 can be coated with a first conductive layer 52, for example, indium tin oxide. The first conductive layer 52 can be coated with a liquid crystal dispersion 53, for example, an aqueous coating of a liquid crystal emulsion in a binder, such as gelatin. The liquid crystal layer 53 can be chill-set or otherwise hardened. A second conductive layer 55 can be formed over the liquid crystal layer, for example, by coating or printing in a layer or a pattern. The roller as described herein can be used to remove the second conductive layer 55 and the liquid crystal layer 53 in one pass, forming chasms 54 as shown in FIG. 4.

As described herein, a roller can be made for skiving. A device or apparatus including one or more rollers can be positioned relative a substrate to remove at least a portion of the material from the substrate, forming a chasm in the substrate. The chasms can be created in the web or cross-web direction on the substrate, and can form a pattern.

Features of the invention as set forth herein are exemplified in the following examples.

EXAMPLES

Materials used herein to form rollers include the following:

ABS plastic from Curbell, Inc., Orchard Park, New York;

Viton #10320 and 40% Teflon filled Isoprene from Mosites Rubber Company, Inc., Fort Worth, Tex.;

Silicone having a low Durometer of 50 Shore A from Silicones, Inc, High Point, N.C., cast by Eastman Kodak Company, Rochester, N.Y.;

Silicone having a medium Durometer of 70 Shore A was Red Silicone #70-S-564 from West American Rubber Co., LLC, of Orange, Calif.;

Hard-Soft-Hard Silicone from Eastman Kodak Company; and

Rulon LD from Dixon Industries Corp., Water North Bennington, Vt.

Other materials used are described in the body of the relevant Example. Unless otherwise stated, materials were supplied by Eastman Kodak Company, Rochester, N.Y.

Example 1

A variety of skiving rollers were prepared as described in Table 1. All the rollers had a smooth surface, an edge with an angle of from 75 to 90 degrees, a width of 3.175 mm, and a diameter of 19.05 mm. The rollers were tested to determine what roller materials were successful in removing a polymer dispersed liquid crystal emulsion coating from a substrate.

Figure 5A:
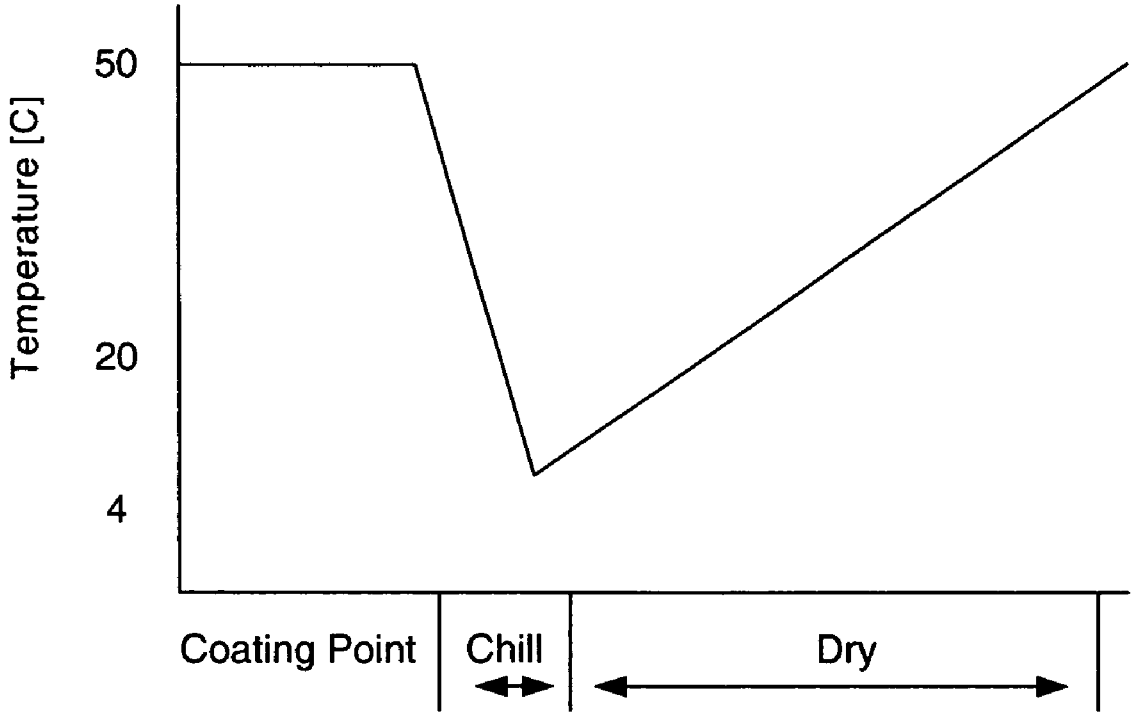
FIG. 5A depicts a coating process timeline with reference to temperature.
Figure 5B:
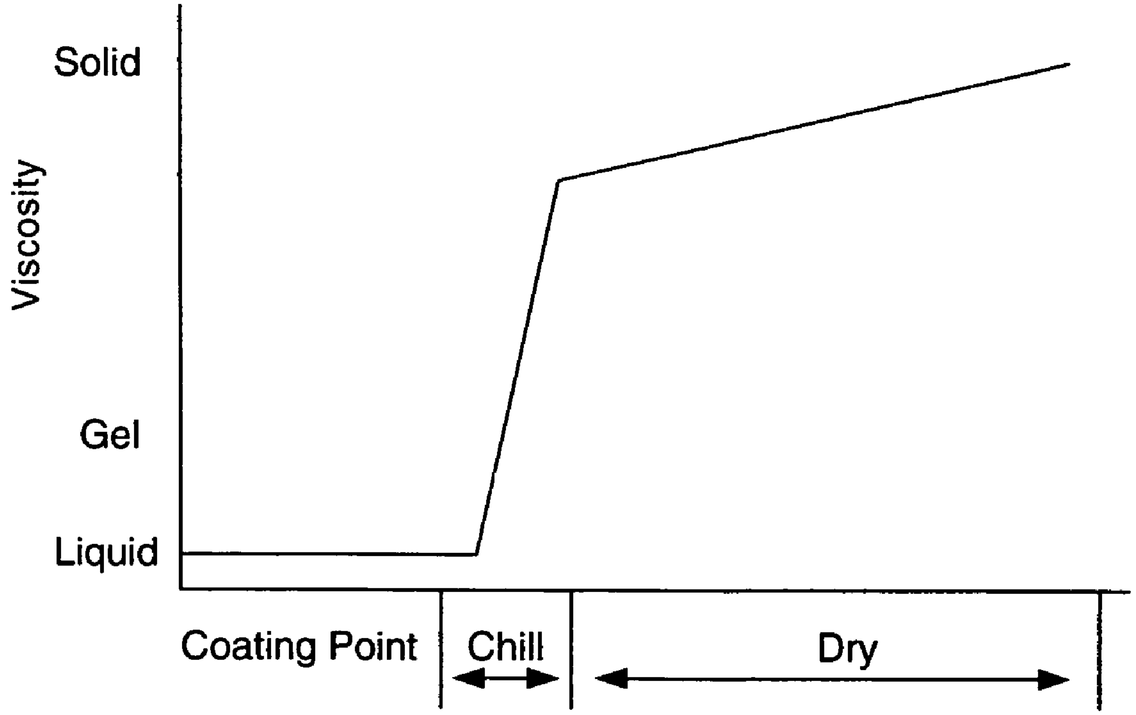
FIG. 5B depicts a coating process timeline with reference to viscosity.
Figure 5C:
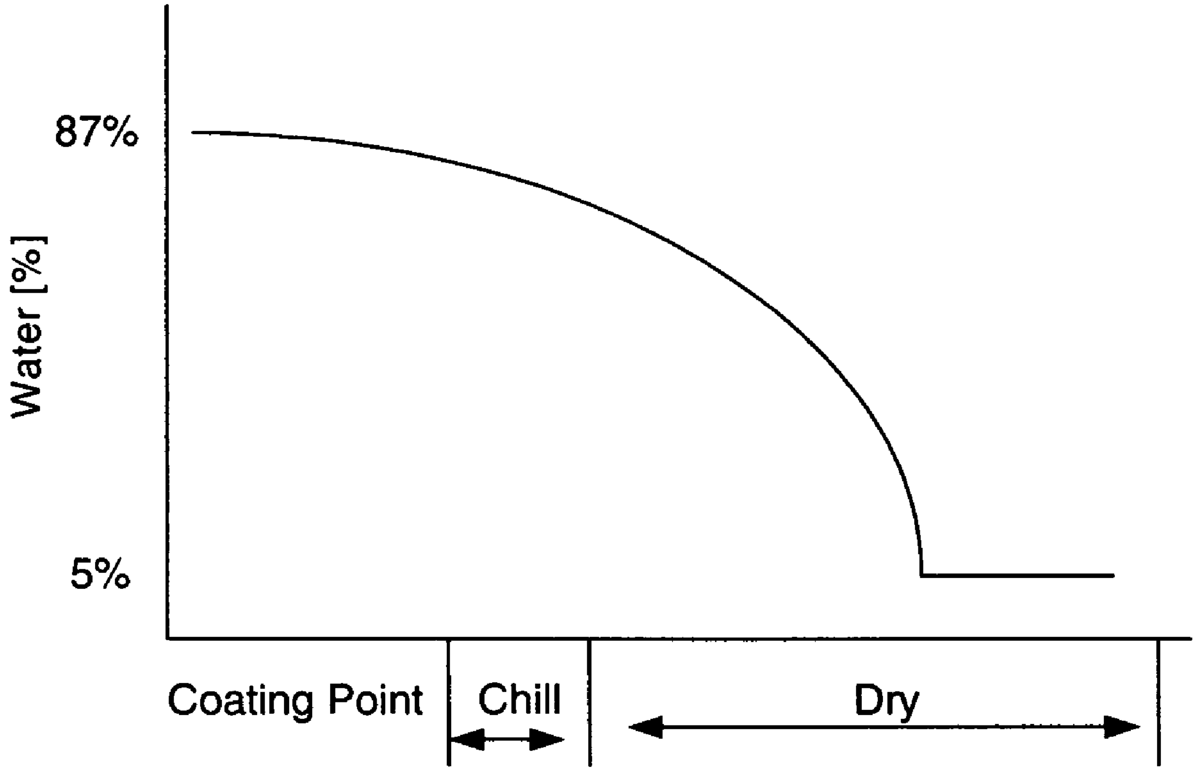
FIG. 5C depicts a coating process timeline with reference to percent solids.

All examples were performed on a roll-to-roll coating machine, wherein a coating pack of gelatin was applied, chill-set, and dried. Skiving was performed in the chill-setting section of the machine. The parameters of the coating process are set forth in FIGS. 5A- 5C.

The material to be skived was prepared as follows. A coating pack of a single layer gelatin system was applied to a substrate having a 250-Angstrom thick conductive layer of an Indium Tin Oxide (300 ohms per square) on a 120-micron polyethylene terephthalate substrate, using a slot hopper. The Indium Tin Oxide coated on the polyethylene terephthalate was from Bekaert Specialty Films, LLC, San Diego, Calif. The gelatin system was a 5 wt % gelatin material containing 8 wt % of MERCK BL118 droplets of cholesteric liquid crystal oil, available from E.M. Industries of Hawthorne, N.Y. U.S.A. The droplets had a volume mean diameter of 10 microns. The gelatin system was applied to the substrate at 38.43 ml/m$^2$, and cooled to 20 degrees Celsius to chill-set the gelatin. As shown in Table 1, the material was skived by each roller at two different times. In one case, the material was skived in line with the coating, after chill-setting of the gelatin. In a second case, the material was prepared, chilled, and dried, and then skived off-line from the coating process.

TABLE 1

| Example | Roller Material | Skived Off-line |
|---|---|---|
| 1 | ABS plastic | Yes |
| 2 | Viton | Yes |
| 3 | Teflon filled Isoprene | Yes |
| 4 | Low Durometer Silicone | Yes |
| 5 | Medium Durometer | Yes |
| 6 | Hard-Soft-Hard Silicone | Yes |
| 7 | ABS plastic | No |
| 8 | Viton | No |
| 9 | Teflon filled Isoprene | No |
| 10 | Low durometer Silicone | No |
| 11 | Medium Durometer | No |
| 12 | Hard-Soft-Hard Silicone | No |

All roller materials effectively removed the chilled gelatin system from the substrate, though some materials produced a better skive than others. The skive quality was determined by the width of the resulting skive, the height of the resulting skive edge, and the visual appearance along the edge of the skived material within the skived area. The edge height refers to any material build-up on top of the gelatin system material remaining after skiving. ABS Plastic achieved the best results, although all skives were at least acceptable in quality. As shown herein, a roller can be used to remove a material from a substrate.

Example 2

A variety of skiving rollers having different materials and varying configurations, were tested. Delrin® from E. I. Dupont de Nemours and Company was used to prepare rollers with different configurations to examine the skiving effectiveness of the different roller configurations. In addition, two other materials, 316 stainless steel and Teflon® (from E. I. Dupont de Nemours and Company) were examined for comparison of roller material effectiveness with the same roller configuration. The results are shown in Table 2.

An aqueous coating solution was prepared containing 3 wt % gelatin, 8 wt % of droplets of dibutylsebacate having a diameter of ten microns, and 0.2 wt % of a coating surfactant. The solution was mixed with gelatin cross-linker bisvinylsulfonylmethane at 3 wt % relative to the total amount of gelatin immediately before coating. The solution was applied at 61.46 ml/m$^2$ to a substrate having 125-micron thick polyethylene terephthalate of 5-inch width coated with an Indium Tin Oxide conductive layer of 300 ohms per square.

A second coating solution was prepared with 4 wt % gelatin and a mixture of pigments formulated to provide a neutral black density. The second coating solution was heated to 45° C., and the viscosity of the solution was 100 centipoises. The solution was continuously coated on the coated substrate at 10.76 ml/m$^2$ on a photographic coating machine. The machine speed was set so that the solution temperature was reduced to 10° C. in a chill section of the machine such that the solution viscosity increased from a liquid state to a very high-viscosity gel state. Located in the chill section was a skiving apparatus having three identical rollers. A first roller was positioned to remove material located at the center of the substrate, and the two remaining rollers were positioned 2.5 cm on either side of the center roller. The wet material had a depth of approximately 100 microns. The material, once chill-set, was completely removed to a depth of 100 microns by the rollers to expose the ITO. A vacuum was applied to the rollers at a level of 20.32 cm of Hg. After passing through the chill box and skiving apparatus, the solution was chill-set hard enough to enable drying by warm air and passage over roller sets in a drying area of the photographic coating equipment. The dried coating had three continuous skives. The target skive width was 3.175 mm.

TABLE 2

| Example | Roller Material | Roller |
|---|---|---|
| 13 | Delrin | 90 degree angle |
| 14 | Delrin | Chamfered |
| 15 | Delrin | Beveled |
| 16 | Delrin | 90 degree patterned |
| 17 | Delrin | Undercut |
| 18 | Delrin | Reservoir |
| 19 | Delrin | Radiused |
| 20 | Teflon | Radiused |
| 21 | smooth 316 Stainless Steel | 90 degree angle |
| 22 | rough 316 Stainless Steel | 90 degree angle |
| 23 | Rulon | 90 degree angle |

All roller shapes effectively removed the desired material from the substrate. The success of the skive quality was determined as described in Example 1. It was found that radiused rollers of Delrin® or Teflon® provided the best skive quality, although all rollers produced at least acceptable skives.

Example 3

The radiused Delrin® roller of Example 2 was tested against other skiving methods for ability to remove hardened material from a substrate.

Preparation

An emulsion of cholesteric liquid crystal oil (BL118® from E. M. Merck, Inc. Hawthorne, N.Y., U.S.A.) was produced according to the methods disclosed in U.S. Pat. No.

6,556,262 to Stephenson et al. The resulting dispersion of liquid crystals had a volume mean diameter of 10 microns with low polydispersity.

Method 1 (Invention):

An aqueous coating solution was prepared containing 13.3 weight percent of liquid crystal emulsion prepared above, 5 weight percent gelatin, and about 0.2 weight percent of a coating surfactant. The coating solution was heated to 45° C., which reduced the viscosity of the emulsion to approximately 8 centipoises. A three percent by weight gelatin cross-linker bisvinylsulfonylmethane was added to the coating solution immediately before coating. A polyethylene terephthalate substrate with 125-micron thickness and 5-inch width having an Indium Tin Oxide conductive layer ("ITO") of 300 ohms per square was continuously coated with the mixed heated emulsion at 61.5 cc/m$^2$ on a photographic coating machine. The machine speed was set so that the emulsion temperature was reduced to 10° C. in the chill section of the machine so that the emulsion viscosity increased from a liquid state to a very high-viscosity gel state. Located in the chill section was a skiving apparatus having three rollers were spaced to remove material located at the center of the substrate and 2.5 cm on either side of the center roller. The wet material had a depth of approximately 100 microns, which was completely removed to expose the ITO. After passing through the chill box and skiving apparatus, the emulsion was chill-set hard enough to enable drying by warm air and passage over roller sets in a drying area of the photographic coating equipment. The dried coating had three continuous skives with target widths of 3.175 mm.

Method 2 (Comparison):

A sample was prepared in the same manner as Method 1, except the skiving apparatus was removed and no skive lines were made. The sample was subsequently skived after drying using the method of U.S. Pat. No. 6,469,757 to produce skives in the same relative locations as those produced by Method 1.

Method 3 (Comparison):

A sample was prepared in the same manner as Method 1, except the skiving apparatus was removed and no skive lines were made. Instead of using the gelatin cross-linker bisvinylsulfonylmethane, distilled water was added to the coating solution immediately before coating. The sample was subsequently skived after drying using the method of U.S. Pat. No. 6,469,757 to produce skives in the same relative locations as those produced by Methods 1 and 2.

Results are shown in Table 3. Widthwise repeatability is reported as the standard deviation of the location of the skive relative to the edge of the substrate. This is an indication of the variability of the repeatability of the skive location relative to the edge of the substrate. Skive width repeatability is reported as the standard deviation of the skive width over the length of 15 cm. This is an indication of the variability of the lengthwise accuracy of the skive width.

TABLE 3

| | Widthwise Accuracy | Widthwise Repeatability | Skive width Repeatability | Physical Appearance |
|---|---|---|---|---|
| Method 1 | Good | 0.047 | 0.024 | Excellent |
| Method 2 | Poor | N/A | N/A | Poor |
| Method 3 | Poor | 0.142 | 0.217 | Poor |

Method 1 resulted in a skive having excellent widthwise and skive width accuracy and repeatability, as well as an excellent physical appearance (cleanliness of skive). The comparison methods 2 and 3 exhibited poor widthwise and skive width accuracy and repeatability, as well as a poor physical appearance. Method 2 did not remove any of the material to be skived.

The invention has been described in detail with particular reference to certain embodiments thereof. Variations and modifications can be effected within the spirit and scope of the invention.

| PARTS LIST | |
|---|---|
| 10 | Skiving Assembly |
| 12 | Support |
| 14 | Housing |
| 15 | Roller |
| 16 | Device |
| 17 | Side of Roller |
| 18 | Face of Roller |
| 21 | Substrate |
| 23 | Material |
| 27 | Manifold |
| 30 | Spacing block |
| 31 | Skiving assembly |
| 51 | Support |
| 52 | First Conductive Layer |
| 53 | Liquid Crystal Layer |
| 54 | Chasm |
| 55 | Second Conductive Layer |
| 60 | Pattern |
| 61 | Portion of Roller Face |
| 62 | Center Portion |
| 63a, b | Side Portion |
| 64 | Channel |
| 65 | Edge |
| 66 | Axis |
| a | Axis of rotation |
| w | Width |
| r | Radius |

The invention claimed is:

1. A process for skiving a substrate, wherein the substrate comprises a support and a layer comprising a light modulating material, the process comprising:

providing the substrate to a skiving assembly comprising at least one roller having a surface;

applying a solvent from the skiving assembly to the layer;

contacting the surface of at least one roller with the layer;

moving the skiving assembly in relation to the substrate to remove at least a portion of the layer and expose at least a portion of the support, and removing the removed layer from the at least one roller; wherein the exposed portion of the support is undamaged.

2. The process of claim 1, wherein the roller surface has a central portion and two side portions.

3. The process of claim 2, wherein at least one of the side portions is longer than the central portion.

4. The process of claim 2, wherein at least one of the side portions is shorter than the central portion.

5. The process of claim 2, wherein the central portion is patterned, convex, concave, parabolic, angled, or a chevron.

6. The process of claim 2, wherein at least one of the side portions is angled, convex, concave, parabolic, or a chevron.

7. The process of claim 2, wherein the side portions are identical.

8. The process of claim 2, wherein the side portions are mirror images.

9. The process of claim 2, wherein the roller further comprises a channel separating the central portion of the surface from at least one of the side portions of the surface.

10. The process of claim 2, wherein the central portion of the roller surface comprises a first material, and at least one of the side portions of the roller surface comprises a second material.

11. The process of claim 1, wherein the assembly comprises a roller positioning system.

12. The process of claim 11, wherein the roller positioning system moves the roller toward and away from the substrate.

13. The process of claim 11, wherein the roller positioning system moves the roller in an arc relative to the substrate.

14. The process of claim 11, wherein the roller positioning system adjusts an angle of intersection of the roller with the layer of the substrate.

15. The process of claim 1, further comprising registering at least one roller of the assembly with the substrate.

16. The process of claim 15, wherein registering comprises moving the substrate on a flanged roller relative to the assembly.

17. The process of claim 15, wherein registering comprises moving the substrate on a translating table relative to the assembly.

18. The process of claim 1, wherein the roller comprises an axle including ball bearings.

19. The process of claim 18, wherein the ball bearings are at least partially enclosed.

20. The process of claim 1, wherein at least a portion of the roller is coated with a coating material.

21. The process of claim 20, wherein the coating material is a fluoropolymer or an acetal resin.

22. The process of claim 1, wherein removing the removed layer comprises applying solvent to the roller surface.

23. The process of claim 22, wherein the solvent is air, water, an acid, a base, an inorganic solvent, or a combination thereof.

24. The process of claim 1, wherein the assembly comprises a vacuum source.

25. The process of claim 24, wherein the vacuum source exerts an absolute force of 0 to 50 N/mm.sup.2 on the roller surface.

26. The process of claim 1, wherein removing the removed layer comprises vacuuming the roller surface.

27. The process of claim 1, wherein the skiving assembly further comprises a solvent station, and the process further comprises:

providing the substrate to the solvent station.

28. The process of claim 1, wherein applying solvent to the layer occurs before contacting the layer with the roller surface.

29. The process of claim 1, wherein the solvent is water.

30. The process of claim 1, wherein the light modulating material is disposed on a substrate comprising a conductive material.

31. The process of claim 1, wherein the roller surface is beveled.

32. The process of claim 1, wherein the roller surface is patterned.

33. The process of claim 1, wherein the roller is made of a machinable material, a moldable material, or a combination thereof.

34. The process of claim 1, wherein the roller is made of stainless steel.

35. The process of claim 1, wherein the roller has a width of 0.1 millimeters to 2 meters.

36. The process of claim 1, wherein the roller has a width of 2 mm to 8 mm.

37. The process of claim 1, wherein the roller is freely rotable.

38. The process of claim 1, wherein the roller is motor-driven.

39. The process of claim 1, wherein the roller is removable from the assembly.

40. The process of claim 1, wherein at least one roller moves in a direction parallel the movement of the substrate.

41. The process of claim 1, wherein at least one roller moves in a direction non-parallel movement of the substrate.

42. The process of claim 1, further comprising changing position of the at least one roller.

43. The process of claim 1, further comprising moving the at least one roller toward and away from the substrate.

44. The process of claim 1, further comprising moving the at least one roller in an arc relative to the substrate.

45. The process of claim 1, further comprising adjusting an angle of intersection of the at least one roller with the layer.

* * * * *

UNITED STATES PATENT AND TRADEMARK OFFICE

CERTIFICATE OF CORRECTION

PATENT NO. : 7,685,692 B2
APPLICATION NO. : 10/851913
DATED : March 30, 2010
INVENTOR(S) : Rankin, Jr. et al.

It is certified that error appears in the above-identified patent and that said Letters Patent is hereby corrected as shown below:

In column 15, line 43, Claim 25, delete "50 N/mm.sup.2"

and insert -- 50 $N/mm^2$ --, therefor.

Signed and Sealed this

First Day of June, 2010

David J. Kappos

*Director of the United States Patent and Trademark Office*